United States Patent [19]

Kaufman

[11] 4,191,505

[45] Mar. 4, 1980

[54] WIND WHEEL ELECTRIC POWER GENERATOR

[75] Inventor: John W. Kaufman, Madison, Ala.

[73] Assignee: The United States of America as represented by the Administrator of the National Aeronautics and Space Administration, Washington, D.C.

[21] Appl. No.: 880,726

[22] Filed: Feb. 24, 1978

[51] Int. Cl.$^2$ ............................................... F03D 3/04
[52] U.S. Cl. .......................................... 415/2; 415/101
[58] Field of Search ................... 415/2, 3, 4, 101, 102, 415/93–95

[56] References Cited

U.S. PATENT DOCUMENTS

| 932,253 | 8/1909 | Daub | 416/122 A X |
|---|---|---|---|
| 997,802 | 7/1911 | DeGeofroy | 415/4 |
| 1,263,983 | 4/1918 | Winne | 415/4 X |
| 1,315,595 | 9/1919 | Clark | 415/3 |
| 4,075,545 | 2/1978 | Haberer | 416/122 |
| 4,076,448 | 2/1978 | Sanders | 415/2 |
| 4,084,918 | 4/1978 | Pavlecka | 415/2 X |

FOREIGN PATENT DOCUMENTS

| 2505954 | 8/1976 | Fed. Rep. of Germany | 415/2 R |
|---|---|---|---|
| 365045 | 9/1906 | France | 415/2 R |
| 595500 | 10/1925 | France | 415/2 R |
| 185939 | 9/1922 | United Kingdom | 415/3 |
| 647929 | 12/1950 | United Kingdom | 415/3 |

*Primary Examiner*—Everette A. Powell, Jr.
*Attorney, Agent, or Firm*—George J. Porter; John R. Manning; L. D. Wofford, Jr.

[57] ABSTRACT

Wind wheel electric power generator apparatus is disclosed as including a housing rotatably mounted upon a vertically disposed support column. Primary and auxiliary funnel-type, venturi ducts are fixedly mounted upon the housing for capturing wind currents and for conducting the same to a bladed wheel adapted to be operatively connected with generator apparatus. Additional air flows are also conducted onto the bladed wheel, all of the air flows positively effecting rotation of the wheel in a cumulative manner. The auxiliary ducts are disposed at an acute angle with respect to the longitudinal axis of the housing, and this feature, together with the rotatability of the housing and the ducts, permits capture of wind currents within a variable directional range.

13 Claims, 4 Drawing Figures

WIND WHEEL ELECTRIC POWER GENERATOR

ORIGIN OF THE INVENTION

The invention described herein was made by an employee of the U.S. Government and may be manufactured and used by or for the Government for governmental purposes without the payment of any royalties thereon or therefor.

BACKGROUND OF THE INVENTION

The present invention relates generally to electric generator apparatus, and more particularly to wind driven electric generator apparatus.

Many wind driven electric generators have of course been developed within years past; however, it has been found that the atmospheric winds tend to mechanically disturb and destroy such devices. An example of one such device is the conventional wind mill. The primary problem characterizing conventional wind mills is the fact that the prevailing winds are directed parallel to the axis of rotation of the wind mill blades and substantially perpendicular to the blades per se. Not only then has it been observed that the atmospheric winds tend to destroy such type of apparatus within a relatively short period of operative use, but even more importantly, or just as importantly, the apparatus is simply not an efficient generator of electric power.

Another type of electric power generator is exemplified by the apparatus disclosed within U.S. Pat. No. 757,800 issued to Williams. While the directional wind flow is substantially perpendicular to the axis of rotation of the paddle wheel, the system is simply too massive and inefficient to service as a practical means of generating electric power. Only a single wind concentrator or nozzle is provided within the Williams system in order to rotate the massive paddle wheel thereof, and it has been found that insufficient dynamic pressures, with correspondingly low wheel speed angular velocities, are developed with such systems.

SUMMARY OF THE INVENTION

Accordingly, it is an object of the present invention to provide a new and improved wind driven electric power generator.

Another object of the present invention is to provide a new and improved wind driven electric power generator which will overcome the disadvantages of prior wind driven electric generators.

Still another object of the present invention is to provide a new and improved wind driven electric power generator which will efficiently generate electrical power.

Yet another object of the present invention is to provide a new and improved wind driven electric power generator which is sturdy and durable, and capable of withstanding exposure to the extreme winds and environmental elements.

The foregoing and other objects are achieved in accordance with the present invention through the provision of a wind driven electric power generator which includes a housing rotatably mounted upon a vertically disposed support column. Primary and auxiliary funnel-type, venturi ducts are fixedly mounted upon the housing for capturing wind currents and for ducting the same to a bladed wheel adapted to be operatively connected with generator apparatus. Additional air flows are also ducted onto the bladed wheel, all of the air flows positively effecting rotation of the wheel in a cumulative manner. The auxiliary ducts are disposed at an acute angle with respect to the longitudinal axis of the housing, and this feature, together with the rotatability of the housing and the ducts, permits capture of wind currents within a variable directional range.

As a result of the venturi principles effected within the apparatus of the present invention, greater dynamic pressures, with correspondingly large forces, are impressed upon the bladed wheel and the buckets thereof with a substantial increase in dynamic and static pressure on the wheel being achieved. Still further, reverse flow characteristics and wind-deflection principles are also employed within the apparatus of the present invention in order to facilitate the simultaneous impingement of the wind currents upon different and separate portions of the bladed wheel in a cumulative manner. The buckets of the bladed wheel are also specially configured so as to optimize vortex shedding principles (reverse direction air flow) in achieving ideal flow conditions on the rear-bottom blades of the wheel.

An embodiment of the invention is illustrated by way of example in the accompanying drawings.

DETAILED DESCRIPTION OF A PREFERRED EMBODIMENT

Figure 1:
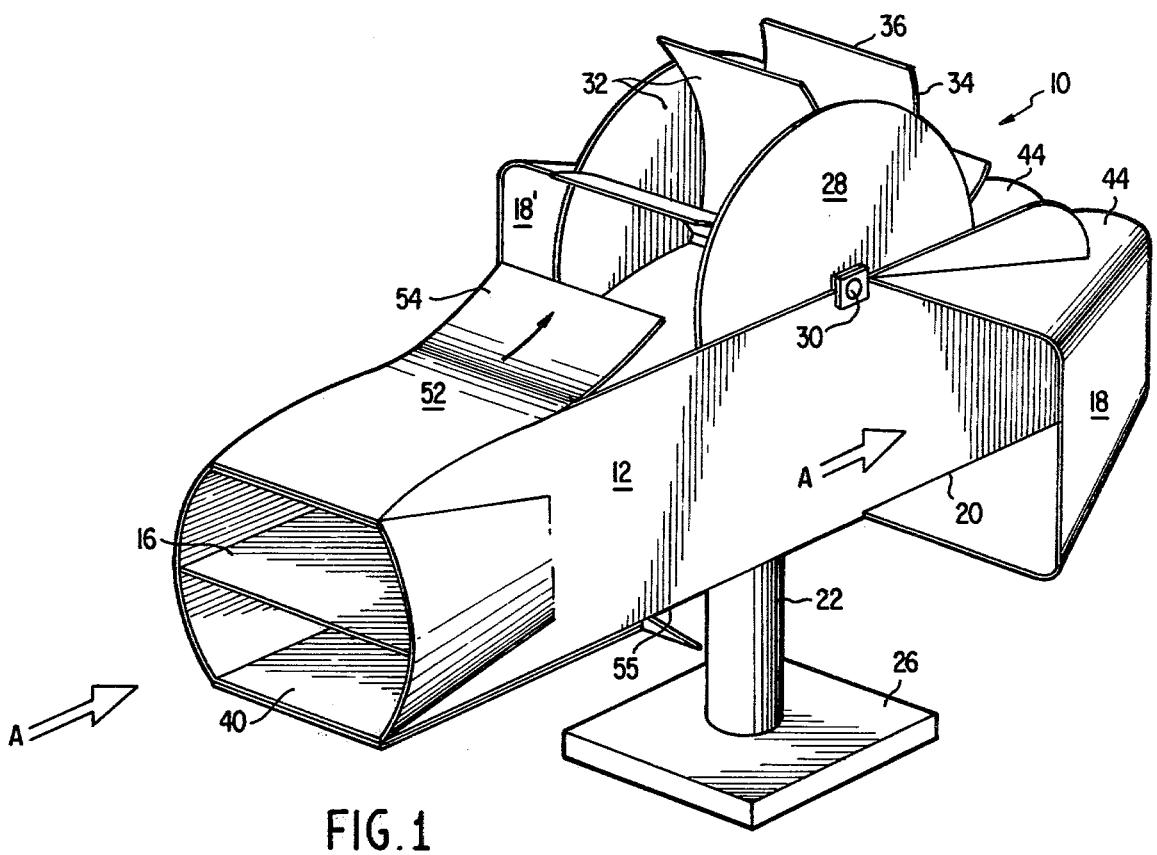
FIG. 1 is a perspective view of a wind-driven electric power generator constructed in accordance with the present invention and showing its cooperative parts.
Figure 2:
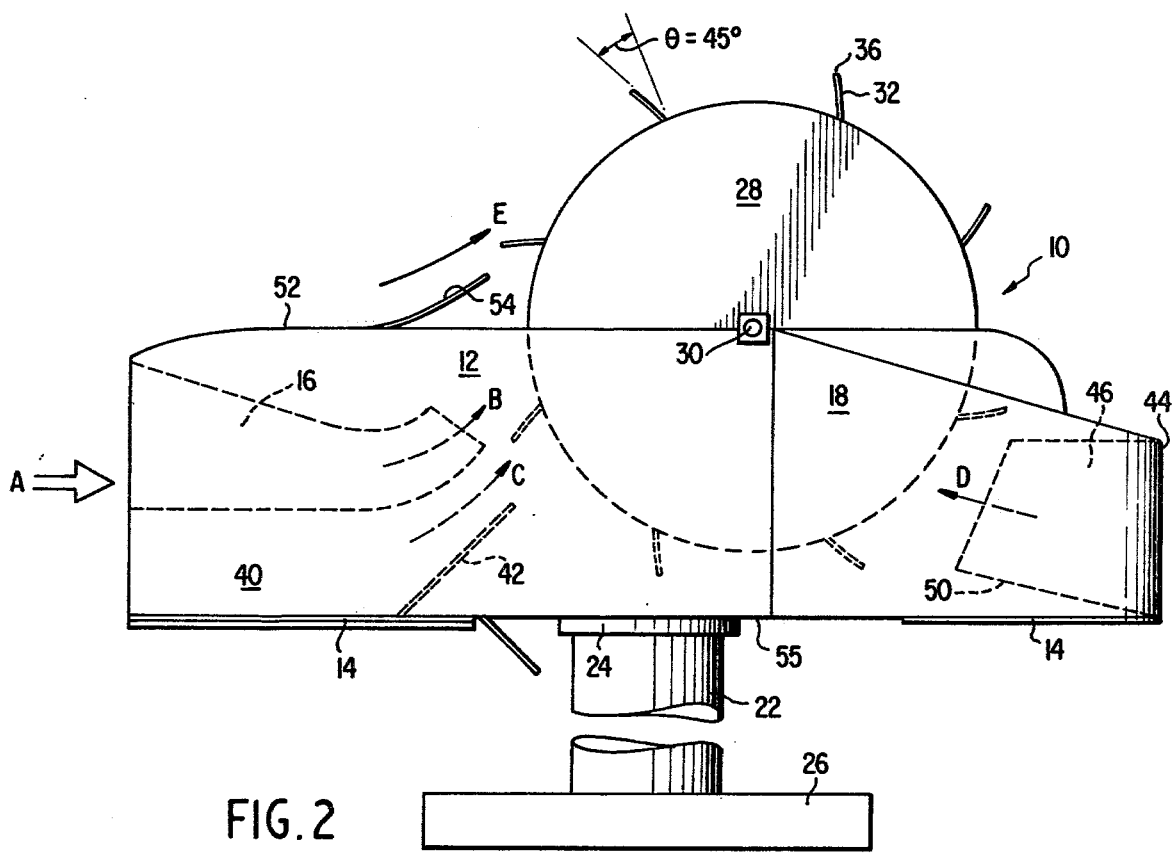
FIG. 2 is a longitudinal cross-sectional view of the apparatus of FIG. 1 taken perpendicular to the longitudinal axis thereof; (Note: Base of housing has open vent, 55, for air flow down and out at base of housing 12.)
Figure 3:
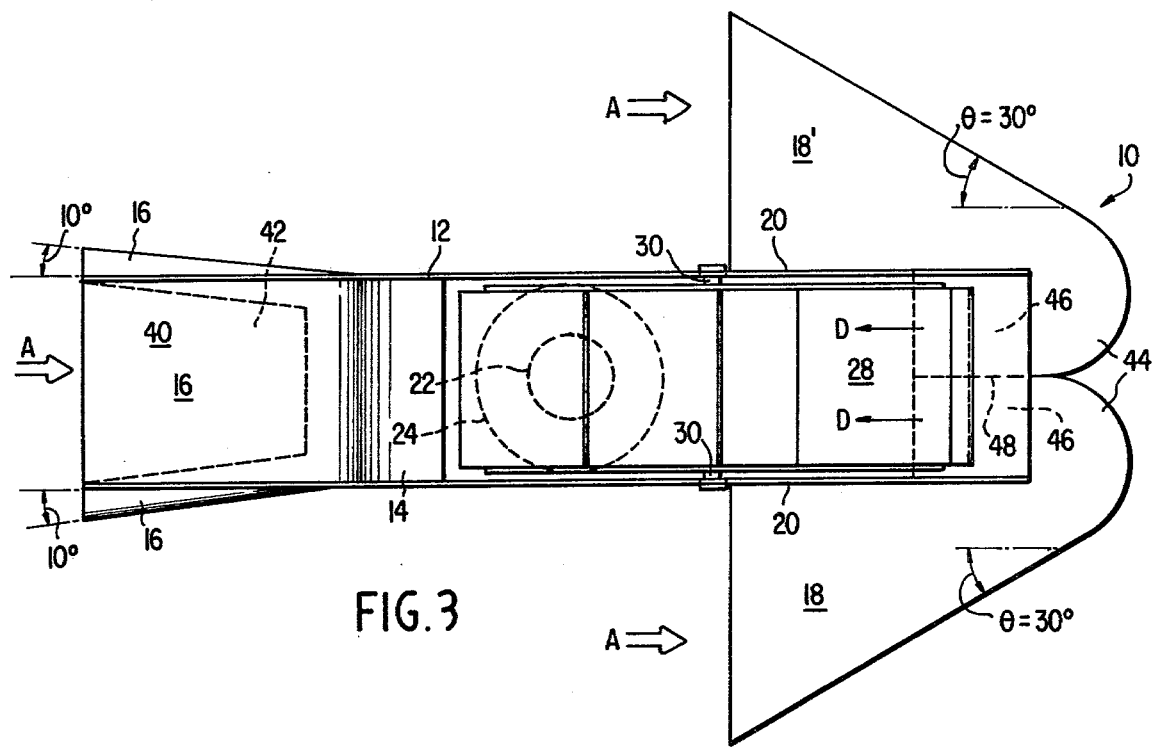
FIG. 3 is a plan view of the apparatus of FIG. 1.

Referring now to the drawings, and more particularly to FIGS. 1-3 thereof, the wind wheel electric power generator, constructed in accordance with the present invention, is generally indicated by the reference character 10 and is seen to comprise a housing 12 fixedly mounted upon a horizontally disposed, substantially planar platfom 14, the peripheral portion of which serves as a housing foundation for main support of overall wheel, ducts, generator housing and attachment to base vertical column assembly.

The forward portion of the housing 12 has a substantially, frusto-conical or funnel-shaped primary air-intake duct 16 fixedly secured therein with the large-area mouth thereof disposed forwardly, air duct 40 below 16, and similarly configured and oriented auxiliary air-intake ducts 18 and 18' are fixedly secured to the external side wall surfaces of housing 12 by means of suitable welds or attachments 20. It is to be noted that the longitudinal axis of each of the auxiliary ducts 18 is disposed at an angle Θ with respect to the longitudinal axis of the housing 12, wherein Θ may have a value of, for example, 30°, of housing surface 12, and in this manner wind direction variability is accounted for. In other words, if the wind direction should shift, such as, for example, from an original wind direction A as denoted by the arrow, and as may be encountered with Sigma wind directions of approximately 10°, the major portions of the air currents generated by such winds can nevertheless be captured by the primary and auxiliary ducts.

In order to provide the generator of the present invention with still greater flexibility in adapting to wind direction changes, the platform 14 is freely, rotatably mounted upon a vertically disposed support column 22 by means of a suitable bearing mechanism 24, and the column 22 is, in turn, fixedly disposed upon a supporting foundation 26. As a result of the rotatable disposition of platform 14 and housing 12, the primary and auxiliary ducts 16, 40 and 18, 18' may be readily aligned with the prevailing wind direction.

Figure 4:
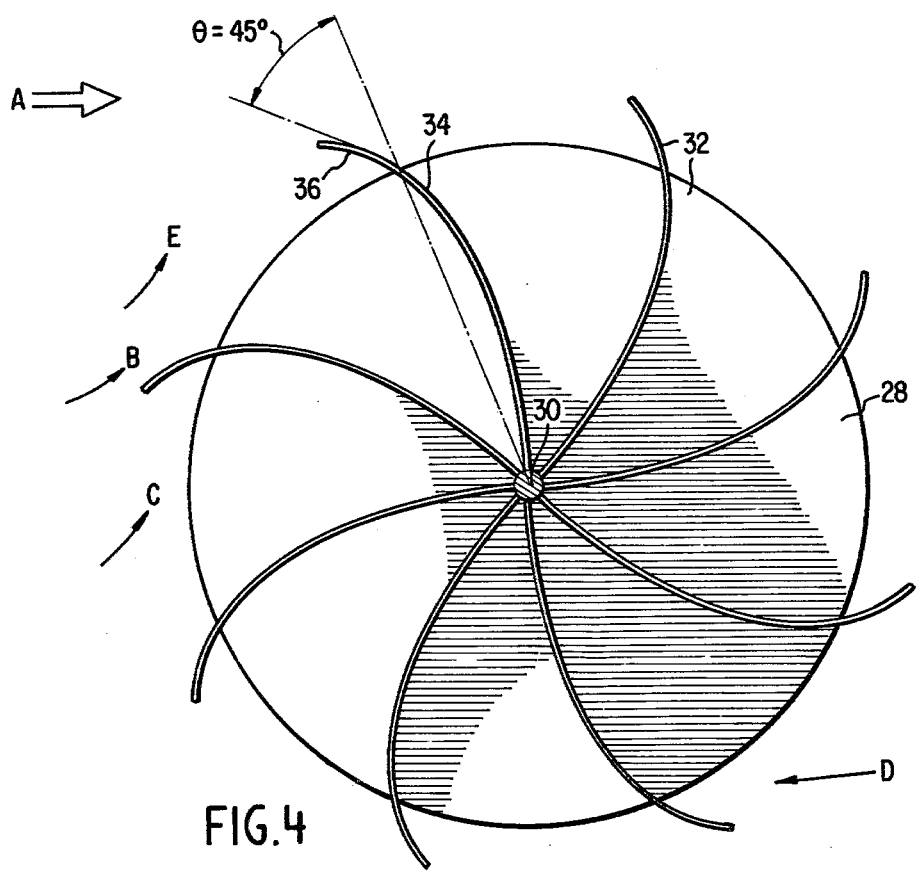
FIG. 4 is a side elevation view of the bladed wheel of the present invention.

With continued reference to FIGS. 1-3, and with additional reference being made to FIG. 4, a wind-driven bladed wheel 28 is rotatably mounted within the upper, rearward portion of housing 12 such that a vertical plane including the horizontally disposed axle 30 of wheel 28 is disposed rearwardly of a vertical plane which includes the axis of column 22. As a result of this relative disposition of wheel 28 within housing 12, the automatic or self-aligning operation of the housing 12 and the air ducts 16, 40 and 18, 18' with respect to the prevailing wind direction, is facilitated.

As can best be seen from FIGS. 2 and 4, the bladed wheel 28 is provided with eight blades or buckets 32 equiangularly disposed about the periphery thereof, and it will be seen from FIG. 1 that the buckets are, in effect, hollow so as to form pockets into which the air currents are ducted. In addition, it is also noted that the bladed surface 34 of each bucket 32 should be disposed along a curvilinear radius of the wheel 28 while the inclined exposed faces 36 be disposed at an angle Θ of approximately 45° with respect to a radial plane extending through the forwardmost attached portion of faces 36 to wheel wall 28. As a result of the foregoing structural characteristics of the buckets 32, it has been found that the same exhibit vortex shedding principles which facilitate rotation of the wheel 28 as well as permit ideal separation of the air flow from the upper, rear, and base 14 air vent 55 portions of the wheel. While the wheel 28 has been illustrated as including eight blades and buckets 32, a greater or lesser number may, of course, be provided (optimally not less than 3 and not more than 16).

In accordance with a primary feature of the present invention, a plurality of air currents are adapted to simultaneously impinge upon the wheel 28 and the various buckets 32 thereof so as to achieve increased revolution rates and greater dynamic/static pressures for converting the kinetic energy of the air currents into mechanical/electrical power. In order to achieve these results, it will be noted from FIG. 2 that the rearward portion of primary duct 16 is constricted so as to form a nozzle such that the air flow therethrough will exhibit Venturi characteristics, and in addition, the noted duct portion is also arcuately configured in an upward manner such that the air flow issuing therefrom is able to impinge, in a substantially tangential manner, upon bladed wheel 28 and more particularly into the upper buckets thereof. This air flow is shown in FIG. 2 by means of arrow B, and it will be appreciated that as a result of the high velocity of such air flow, as dictated by the Venturi nozzle portion of the duct 16, substantial positive pressures are impressed upon the wheel 28.

In conjunction with the air flow ducted through primary duct 16, a forward air intake vent 40 is defined beneath the primary duct 16 within the forward portion of housing 12 by means of the housing side walls, duct 16, and an upwardly directed, arcuately configured deflector 42. The lower, forward end of deflector 42 is fixedly secured to platform 14 which, in effect, forms the bottom wall or floor of housing 12, and the upper, rear end of deflector 42 terminates within the vicinity of wheel 28 at a height level below that of the Venturi nozzle of duct 16. In this manner, the air currents C flowing through the vent 40 are able to additionally influence the rotation of wheel 28 in a positive and cumulative manner along with the air currents B issuing from the Venturi nozzle of duct 16.

As noted hereinabove, the auxiliary ducts 18, 18' are also adapted to capture air currents generated by the prevailing winds, and in order to best utilize the pressure forces thereof for likewise causing rotation of bladed wheel 28, elbow-shaped conduits or ducts 44 are integrally connected to the rear ends of ducts 18, 18'. The downstream ends of the ducts 44 are disposed toward each other and are fixed within the rear portion of housing 12. An axially aligned conduct or manifold 46 is integrally formed with the downstream terminal ends of ducts 44, and in this manner, the air flows ducted through ducts 44 merge into a single air flow D such that the same is directed in a forward direction substantially tangential to the bottom blades/buckets of wheel 28 so as to impinge upon the lowermost bucket 32. It is thus seen that air flow D likewise positively influences the rotational characteristics of wheel 28 in a cumulative manner along with air flows B and C.

Due to the fact that the two original air flows within conduits 44 flow in directions which oppose each other sensewise prior to their merger from manifold 46 in forming single air flow D, the substantial amount of turbulence at opening of ducts 18 and 18' would be reduced at manifold 46, with air flow speed increased at D causing substantially increased pressures on blades 32 from kinetic energy. In order to therefore smoothly facilitate the merger of the air flows issuing from conduits 44, a substantial separator wall 48 is disposed at the juncture of conduits 44 along the axis of manifold 46. The sidewall surface of deflector 48 thus serves to properly direct the individual air flows issuing from both conduits 44, and in this manner, the original air flows ducted through ducts 18 and conduits 44 have their flow directions reversed substantially (180°) whereby the same are able to flow in a substantially laminar manner out of manifold 46. In order to enhance the flow characteristics of air flow D still further, it is also noted that the bottom wall or floor of manifold 46 is extended in a forward direction so as to form an upwardly directed, arcuately configured deflector 50 which is fixedly secured to ducts 18 and 18'.

As a last means of defining still another directed air flow for cumulatively affecting the rotational characteristics of wheel 28 in a positive manner, the upper forward surface or cowling 52 of housing 12, which is integral with, and disposed directly above primary intake duct 16, is provided with a sinusoidal configuration with the rear end thereof directed arcuately upwardly so as to form a deflector 54. As a result of this structure, air currents flowing over the cowling 54 of housing 12 will be ducted, in a less turbulent manner, toward deflector 54 whereby the latter will serve to direct such air flows E onto the upper blades or buckets as seen in FIGS. 1, 2 and 4. The deflector 54 also serves the important purpose of preventing the air currents from impinging directly upon the wheel 28 and the blades 32 in a direction parallel to platform 14. If such did in fact occur, reverse or stagnation pressure characteristics would prevail which would adversely affect the rotational operation of wheel 28.

In utilizing the wind wheel electric power generator of the present invention for commercial or residential purposes, it is of course realized that the wheel 28 will be operatively associated with electrical generator apparatus which may be directly driven by the wheel through conventional coupling mechanisms connected to the ends of wheel axle 30, or alternatively, the entire wheel component 28 may be fabricated as the primary electrical power generator component. The electrical energy generated can then of course be utilized directly, or alternatively, stored in suitable storage batteries for post energy generation periods of use. If desired, housing 12 can accommodate the electrical generator, storage batteries, and other components, and it is further desirable to incorporate into the system suitable wind intake valves, not shown, for controlling the wind flow rate and directions into the system and onto the wheel 28. Such means accommodate excessive wind loads upon the wheel for, in turn, controlling the revolution rate of the wheel. It has been determined that if the wheel rotates at a substantially constant speed during its operative periods, then electrical energy can be generated most efficiently in accordance with generator principles.

This wind wheel system of the present invention may be fabricated of any one or a combination of suitable structural materials which are preferably light in weight yet strong and durable such that the system can withstand the exposure to the extreme wind speeds and atmospheric turbulence characteristic of the earth's planetary boundary layer as well as exposure to the weather and environmental elements. The height of the apparatus should also extend to a level of approximately 35-40 meters above the ground level in order to advantageously accommodate the prevailing winds. At these levels, the winds have been found to be calm only approximately 3-5% of the time, both during day and night time periods, and consequently, the apparatus of the present invention can be especially useful in areas characterized by consistent wind flow patterns or in valleys and/or canyons where the wind speed is moderate.

It is thus seen that the apparatus of the present invention has important advantages over known prior art devices in that the same can effectively generate electrical power due to the fact that the apparatus advantageously employs a multiple air flow bladed wheel system embodying Venturi, reverse flow, vortex-shedding, and wind deflection principles. As the directional air flows are also perpendicular to the axis of rotation, as opposed to being parallel thereto as is characteristic of conventional windmill type generators, the system of the present invention is vastly more efficient. Laminar flow principles are also achieved with the apparatus of the present invention and the apparatus could very well be used as a primary source of electrical energy generation, or alternatively, as a supplemental source of power with respect to existing systems, such as, for example, solar energy conversion systems.

It is recommended that a direct current (D.C.), self-inductance, variable speed electric generator be employed with this wind wheel electric power generator (WWEPG) system for most efficient power output. However, an alternating current generator may be used to provide optimum power, especially for direct use of output power of the WWEPG system.

Obviously, many modifications and variations of the present invention are possible in light of the teachings noted hereinabove. Consequently, it is to be understood that within the scope of the appended claims, the present invention may be practiced otherwise than as specifically described herein.

What is claimed as new and desired to be protected by letters patent of the United States is:

1. A wind driven power generator, comprising:
    wheel means adapted to be operatively connected to electric power generator means; and
    means defining a plurality of air flows for simultaneously impinging upon different portions of said wheel means for cumulatively effecting rotation of said wheel means and the operation of said electric power generator means for the generation of electric power,
    said air flow means comprising a first primary air duct means for directing a first air flow onto a first portion of said wheel means; and
    auxiliary air duct means for directing a second air flow onto a second portion of said wheel means, said auxiliary duct means comprising a pair of ducts disposed upon opposite sides of said wheel means, and
    manifold means for receiving the air flows conducted through said pair of ducts and for merging said flows into said second air flow.

2. The wind driven electric power generator as set forth in claim 1, further comprising:
    deflector means disposed within said auxiliary duct means at the juncture of said pair of ducts and said manifold means for facilitating the smooth merger of said air flows.

3. The wind driven electric power generator as set forth in claim 1, wherein:
    said auxiliary duct means are disposed at an acute angle with respect to the longitudinal axis of said primary air duct,
    whereby said primary and auxiliary angular outer walls of ducts accommodate variable wind directions.

4. A wind driven mechanism comprising:
    (a) a housing mounted for rotation about a main axis and having a centrally located primary air intake and a pair of laterally located auxiliary air intakes on each side of the primary air intake;
    (b) a wind wheel mounted on the housing for rotation about a laterally extending axis perpendicular to the main axis, and having a plurality of curved wind buckets on the periphery of the wind wheel;
    (c) primary duct means associated with the primary air intake for directing entering air into impingement with the wind buckets located on a first portion of the wheel; and
    (d) auxiliary duct means associated with the auxiliary air intakes for directing entering air into impingement with the curved buckets located on a second portion of the wheel.

5. A wind driven mechanism according to claim 4 wherein the first portion of the wheel is upstream of the axis of rotation of the wheel, and the second portion of the wheel is downstream of such axis.

6. A wind driven mechanism according to claim 5 wherein the duct means causes air to impinge on the wind buckets located below the axis of rotation of the wheel.

7. A wind driven mechanism according to the claim 5 wherein the duct means are curved to turn the air upwardly from its direction entering the intakes.

8. A wind driven mechanism according to claim 7 wherein the duct means are configured as venturi nozzles.

9. A wind driven mechanism according to claim 4 wherein the wind wheel extends outside the housing and the curved buckets are exposed to ambient air that bypasses the duct means.

10. A wind driven mechanism according to claim 9 wherein the housing is provided with an upwardly curved vane that directs ambient air bypassing the primary duct means into impingement with the buckets of the wind wheel.

11. A wind driven mechanism according to claim 10 wherein the duct means causes air to impinge on wind buckets located below the axis of rotation of the wheel.

12. A wind driven mechanism according to claim 10 wherein the duct means are curved to turn the air upwardly from its direction entering the intakes.

13. A wind driven mechanism according to claim 12 wherein the duct means are configured as venturi nozzles.

* * * * *